United States Patent
Heap et al.

(10) Patent No.: US 6,976,388 B2
(45) Date of Patent: Dec. 20, 2005

(54) DIAGNOSTIC METHOD FOR A TORQUE CONTROL OF AN ELECTRICALLY VARIABLE TRANSMISSION

(75) Inventors: Anthony H. Heap, Ann Arbor, MI (US); Tung-Ming Hsieh, Carmel, IN (US); Gregory A. Hubbard, Brighton, MI (US); Todd M. Steinmetz, Escanaba, MI (US); Xuefeng T. Tao, Northville, MI (US)

(73) Assignee: General Motors Corporation, Detroit, MI (US)

( * ) Notice: Subject to any disclaimer, the term of this patent is extended or adjusted under 35 U.S.C. 154(b) by 14 days.

(21) Appl. No.: 10/846,142

(22) Filed: May 14, 2004

(65) Prior Publication Data

US 2005/0252283 A1 Nov. 17, 2005

(51) Int. Cl.⁷ .............................................. G01M 13/02
(52) U.S. Cl. .................... 73/118.1; 73/488; 701/29; 701/51
(58) Field of Search .................. 73/118.1, 488, 73/507, 510, 511, 530; 180/338; 701/29, 701/51

(56) References Cited

U.S. PATENT DOCUMENTS

| | | | | |
|---|---|---|---|---|
| 5,931,757 A | * | 8/1999 | Schmidt | 475/2 |
| 6,358,173 B1 | * | 3/2002 | Klemen et al. | 475/5 |
| 6,478,705 B1 | * | 11/2002 | Holmes et al. | 475/5 |
| 6,551,208 B1 | * | 4/2003 | Holmes et al. | 475/5 |
| 6,842,673 B2 | * | 1/2005 | Zhang et al. | 701/22 |
| 2005/0080535 A1 | * | 4/2005 | Steinmetz et al. | 701/51 |

\* cited by examiner

*Primary Examiner*—David Gray
*Assistant Examiner*—Freddie Kirkland, III
(74) *Attorney, Agent, or Firm*—Christopher DeVries (57) ABSTRACT

A condition of impaired speed and torque control of a parallel electrically variable transmission due to factors beyond nominal modeling and estimation errors is diagnosed under low speed operation. The transmission includes at least one electric machine and a motor torque controller for regulating the transmission input speed and output torque. The motor torque controller includes an open-loop control path based on predetermined torques and accelerations and a closed loop control path based on input speed error. The presence of a larger than expected closed-loop correction magnitude, combined with low output speed and one or more other conditions is used to diagnose a condition of potential torque error, in which case the transmission control is altered to prevent unwanted operation.

9 Claims, 7 Drawing Sheets

DIAGNOSTIC METHOD FOR A TORQUE CONTROL OF AN ELECTRICALLY VARIABLE TRANSMISSION

TECHNICAL FIELD

The present invention is related to control of a parallel electrically variable transmission, and more particularly to a method of diagnosing the operation of a transmission output torque control.

BACKGROUND OF THE INVENTION

An electrically variable transmission (EVT) can be advantageously used in conjunction with an internal combustion engine to provide an efficient parallel hybrid drive arrangement. Various mechanical/electrical split contributions can be effected to enable high-torque continuously variable speed ratios, electrically dominated launches, regenerative braking, engine off idling, and multi-mode operation. See, for example, the two-mode, compound split, electromechanical transmission shown and described in the U.S. Pat. No. 5,931,757 to Schmidt, where an internal combustion engine and two electric machines (motors/generators) are variously coupled to three interconnected planetary gearsets. Such parallel EVT transmissions enjoy many advantages, such as enabling the engine to run continuously in high efficiency operating regimes, and achieving both reverse and forward operation in the same mechanical mode simply by controlling the rotation of the electric machines.

In a typical application, the electric machines are controlled for achieving both a desired input (i.e., engine) speed and a desired output torque. A similar control can be used in the case of mechanical mode changing (i.e., shifting), in which case the control can be based on a desired clutch slip profile. Various measured or estimated input parameters for the control include the transmission input torque and the input and output shaft speeds and accelerations. While the control objectives may theoretically be achieved with an open-loop control strategy, some form of closed-loop correction is usually employed in order to compensate for modeling and estimation errors. For example, a closed-loop correction may be determined based on input speed error, and attributed to the most likely sources of error. However, errors may also arise due to unexpected circumstances such as sub-system abnormalities and apparent changes in inertia due to friction, and the authority of the closed loop correction may be insufficient to compensate for the errors. In such cases, the actual output torque may deviate from the desired output torque, and it would be desirable to detect the existence of such a possibility, particularly at low speed operation of the transmission near the boundary between forward and reverse operation.

SUMMARY OF THE INVENTION

The present invention is directed to an improved control of a parallel electrically variable transmission, including a method of diagnosing a condition of impaired speed and torque control due to factors beyond nominal modeling and estimation errors, particularly under low speed operation. The transmission includes at least one electric machine and a motor torque controller for regulating the transmission input speed and output torque. In a preferred embodiment, the motor torque controller includes an open-loop control path based on predetermined torques and accelerations and a closed loop control path based on input speed error. The presence of a larger than expected closed-loop correction, combined with low output speed and one or more other conditions is used to diagnose a condition of potential torque error, in which case the transmission control is altered to prevent unwanted operation.

DESCRIPTION OF THE PREFERRED EMBODIMENT

Figure 1:
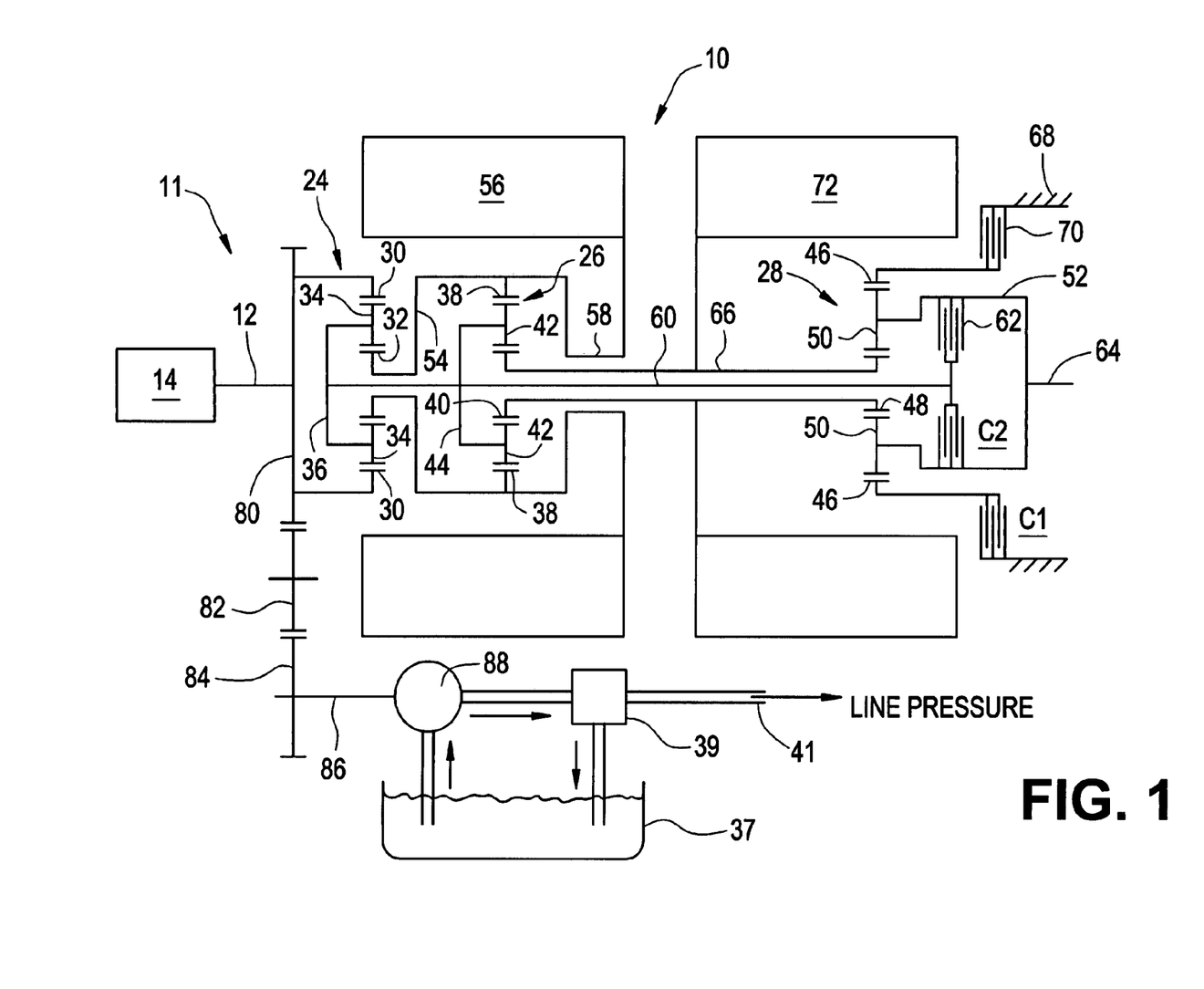
FIG. 1 is a mechanical hardware schematic representation of one preferred form of a two-mode, compound-split, electrically variable transmission particularly suited to the diagnostic control of the present invention.
Figure 2:
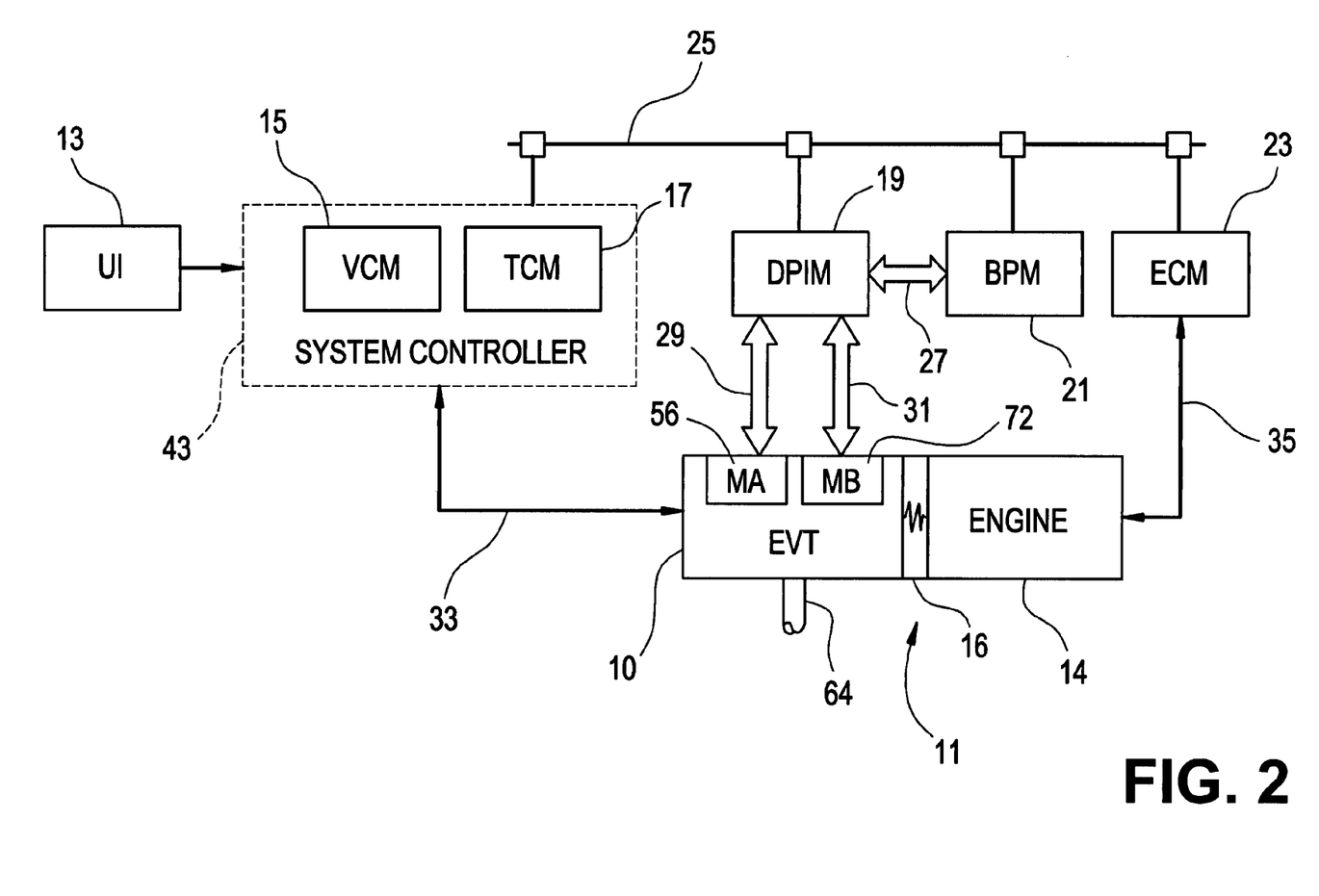
FIG. 2 is an electrical and mechanical schematic of a preferred system architecture for implementing the diagnostic control of the present invention.

With reference first to FIGS. 1 and 2, a vehicular powertrain is generally designated 11. Included in the powertrain 11 is one representative form of a multi-mode, compound-split, electrically variable transmission (EVT) particularly suited for implementing the controls of the present invention and designated generally by the numeral 10 in FIGS. 1 and 2. With particular reference, then, to those figures, the EVT 10 has an input member 12 that may be in the nature of a shaft which may be directly driven by an engine 14 or, as shown in FIG. 2, a transient torque damper 16 may be incorporated between the output member of the engine 14 and the input member of the EVT 10. The transient torque damper 16 may incorporate, or be employed in conjunction with, a torque transfer device (not shown) to permit selective engagement of the engine 14 with the EVT 10, but it must be understood that such a torque transfer device is not utilized to change, or control, the mode in which the EVT 10 operates.

In the embodiment depicted, the engine 14 may be a fossil fuel engine, such as a diesel engine which is readily adapted to provide its available power output delivered at a constant number of revolutions per minute (RPM). In the exemplary embodiment to which FIGS. 1 and 2 are directed, the engine 14 can—after start-up, and during the majority of its input—operate at a constant speed or at a variety of constant speeds in accordance with a desired operating point as may be determined from operator inputs and driving conditions.

The EVT 10 utilizes three planetary gear subsets 24, 26 and 28. The first planetary gear subset 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear subset 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear subset 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

While all three planetary gear subsets 24, 26 and 28 are "simple" planetary gear subsets in their own right, the first and second planetary gear subsets 24 and 26 are compounded in that the inner gear member 32 of the first planetary gear subset 24 is conjoined, as through a hub plate gear 54, to the outer gear member 38 of the second planetary gear subset 26. The conjoined inner gear member 32 of the first planetary gear subset 24 and the outer gear member 38 of the second planetary gear subset 26 are continuously connected to a first motor/generator 56, as by a sleeve shaft 58. First motor/generator 56 may also be referred to herein variously as motor A or $M_A$.

The planetary gear subsets 24 and 26 are further compounded in that the carrier 36 of the first planetary gear subset 24 is conjoined, as through a shaft 60, to the carrier 44 of the second planetary gear subset 26. As such, carriers 36 and 44 of the first and second planetary gear subsets 24 and 26, respectively, are conjoined. The shaft 60 is also selectively connected to the carrier 52 of the third planetary gear subset 28, as through a torque transfer device 62 which, as will be hereinafter more fully explained, is employed to assist in the selection of the operational modes of the EVT 10. Torque transfer device 62 may also be referred to herein variously as second clutch, clutch two or C2.

The carrier 52 of the third planetary gear subset 28 is connected directly to the transmission output member 64. When the EVT 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear subset 26 is connected to the inner gear member 48 of the third planetary gear subset 28, as through a sleeve shaft 66 that circumscribes shaft 60. The outer gear member 46 of the third planetary gear subset 28 is selectively connected to ground, represented by the transmission housing 68, through a torque transfer device 70. Torque transfer device 70, as is also hereinafter explained, is also employed to assist in the selection of the operational modes of the EVT 10. Torque transfer device 70 may also be referred to herein variously as first clutch, clutch one or C1.

The sleeve shaft 66 is also continuously connected to a second motor/generator 72. Second motor/generator 72 may also be referred to herein variously as motor B or $M_B$. All the planetary gear subsets 24, 26 and 28 as well as motor A and motor B (56, 72) are coaxially oriented, as about the axially disposed shaft 60. It should be noted that both motors A and B are of an annular configuration which permits them to circumscribe the three planetary gear subsets 24, 26 and 28 such that the planetary gear subsets 24, 26 and 28 are disposed radially inwardly of the motors A and B. This configuration assures that the overall envelope—i.e., the circumferential dimension—of the EVT 10 is minimized.

A drive gear 80 may be presented from the input member 12. As depicted, the drive gear 80 fixedly connects the input member 12 to the outer gear member 30 of the first planetary gear subset 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and 88 which is supplied transmission fluid from sump 37, delivering high pressure fluid to regulator 39 which returns a portion of the fluid to sump 37 and provides regulated line pressure in line 41.

In the described exemplary mechanical arrangement, the output member 64 receives power through two distinct gear trains within the EVT 10. A first mode, or gear train, is selected when the first clutch C1 is actuated in order to "ground" the outer gear member 46 of the third planetary gear subset 28. A second mode, or gear train, is selected when the first clutch C1 is released and the second clutch C2 is simultaneously actuated to connect the shaft 60 to the carrier 52 of the third planetary gear subset 28.

Those skilled in the art will appreciate that the EVT 10 is capable of providing a range of forward output speeds from relatively slow to relatively fast within each mode of operation, and a reverse drive of the output member 64 when the first mode is selected. In addition, a fixed-ratio state wherein both clutches C1 and C2 are simultaneously applied is available for efficient mechanical coupling of the input member to the output member through a fixed gear ratio. Furthermore, a neutral state wherein both clutches C1 and C2 are simultaneously released is available for mechanically decoupling the output member from the transmission. Finally, the EVT 10 is capable to provide synchronized shifts between the modes wherein slip speed across both clutches C1 and C2 is substantially zero. Additional details regarding operation of the exemplary EVT can be found in commonly assigned U.S. Pat. No. 5,931,757, incorporated herein by reference.

Engine 14 is preferably a diesel engine and electronically controlled by engine control module (ECM) 23 as illustrated in FIG. 2. ECM 23 is a conventional microprocessor based diesel engine controller comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. ECM 23 functions to acquire data from a variety of sensors and control a variety of actuators, respectively, of the engine 14 over a plurality of discrete lines. For simplicity, ECM 23 is shown generally in bi-directional interface with engine 14 via aggregate line 35. Among the various parameters that may be sensed by ECM 23 are oil sump temperature, engine coolant temperature (ECT), engine speed (Ne), turbo pressure, and ambient air temperature and pressure. Various actuators that may be controlled by the ECM 23 include fuel injectors, fan controllers, engine pre-heaters including glow plugs and grid-type intake air heaters. ECM preferably provides for well-known torque-based controls for engine 14 in response to a torque command Te_cmd provided by the EVT control system. Such engines electronics, controls and quantities are generally well known to those skilled in the art and further detailed exposition thereof is not required herein.

As should be apparent from the foregoing description the EVT 10 selectively receives power from the engine 14. As will now be explained with continued reference to FIG. 2, the EVT also receives power from an electric storage device such as one or more batteries in battery pack module (BPM) 21. Other electric storage devices that have the ability to store electric power and dispense electric power may be used in place of the batteries if desired. The BPM 21 is high voltage DC coupled to dual power inverter module (DPIM) 19 via DC lines 27. Current is transferable to or from the BPM 21 in accordance with whether the BPM 21 is being charged or discharged. DPIM 19 includes a pair of power inverters and respective motor controllers configured to receive motor control commands and control inverter states therefrom for providing motor drive or regeneration functionality. Motor controllers are microprocessor based controllers comprising such common elements as microprocessor, read only memory ROM, random access memory RAM, electrically programmable read only memory EPROM, high speed clock, analog to digital (A/D) and digital to analog (D/A) circuitry, and input/output circuitry and devices (I/O) and appropriate signal conditioning and buffer circuitry. In motoring control, the respective inverter receives current from the DC lines and provides AC current to the respective motor over high voltage phase lines 29 and 31. In regeneration control, the respective inverter receives AC current from the motor over high voltage phase lines 29 and 31 and provides current to the DC lines 27. The net DC current provided to or from the inverters determines the charge or discharge operating mode of the BPM 21. Preferably, MA and MB are three-phase AC machines and the inverters comprise complementary three-phase power electronics. Individual motor speed signals Na and Nb for MA and MB, respectively, are also derived by the DPIM 19 from the motor phase information or conventional rotation sensors. Such motors, electronics, controls and quantities are generally well known to those skilled in the art and further detailed exposition thereof is not required herein.

System controller 43 is a microprocessor based controller comprising such common elements as microprocessor, read only memory ROM, random access memory RAM, electrically programmable read only memory EPROM, high speed clock, analog to digital (A/D) and digital to analog (D/A) circuitry, digital signal processor (DSP), and input/output circuitry and devices (I/O) and appropriate signal conditioning and buffer circuitry. In the exemplary embodiment, system controller 43 comprises a pair of microprocessor based controllers designated as vehicle control module (VCM) 15 and transmission control module (TCM) 17. VCM and TCM may provide, for example, a variety of control and diagnostic functions related to EVT and vehicle chassis including, for example, engine torque commands, input speed control, and output torque control in coordination with regenerative braking, anti-lock braking and traction control. Particularly with respect to EVT functionality, system controller 43 functions to directly acquire data from a variety of sensors and directly control a variety of actuators, respectively, of the EVT over a plurality of discrete lines. For simplicity, System controller 43 is shown generally in bi-directional interface with EVT via aggregate line 33. Of particular note, system controller 43 receives frequency signals from rotation sensors for processing into input member 12 speed Ni and output member 64 speed No for use in the control of EVT 10. System controller 43 may also receive and process pressure signals from pressure switches (not separately illustrated) for monitoring clutch C1 and C2 application chamber pressures. Alternatively, pressure transducers for wide range pressure monitoring may be employed. PWM and/or binary control signals are provided by system controller to EVT 10 for controlling fill and drain of clutches C1 and C2 for application and release thereof. Additionally, system controller 43 may receive transmission fluid sump 37 temperature data, such as from conventional thermocouple input (not separately illustrated) to derive sump temperature Ts and provide a PWM signal which may be derived from input speed Ni and sump temperature Ts for control of line pressure via regulator 39. Fill and drain of clutches C1 and C2 are effectuated by way of solenoid controlled spool valves responsive to PWM and binary control signals as alluded to above. Similarly, line pressure regulator 39 may be of a solenoid controlled variety for establishing regulated line pressure in accordance with the described PWM signal. Such line pressure controls are generally well known to those skilled in the art. Clutch slip speeds across clutches C1 and C2 are derived from output speed No, $M_A$ speed Na and $M_B$ speed Nb; specifically, C1 slip is a function of No and Nb, whereas C2 slip is a function of No, Na and Nb. Also illustrated is user interface (UI) block 13 which comprises such inputs to system controller 43 such as vehicle throttle position, push button shift selector (PBSS) for available drive range selection, brake effort and fast idle requests among others. System controller 43 determines a torque command Te_cmd and provides it to ECM 23. Torque command Te_cmd is representative of the EVT torque contribution desired from the engine 14 as determined by the system controller 43.

The various modules described (i.e., system controller 43, DPIM 19, BPM 21, ECM 23) communicate via controller area network (CAN) bus 25. The CAN bus 25 allows for communication of control parameters and commands between the various modules. The specific communication protocol utilized will be application specific. For example, the preferred protocol for heavy duty applications is the Society of Automotive Engineers standard J1939. The CAN bus and appropriate protocols provide for robust messaging and multi-controller interfacing between the system controller, ECM, DPIM, BPIM and other controllers such as antilock brake and traction controllers.

For transmission speed and torque control during MODE 1 and MODE 2 the dynamic equations for the EVT are determined using Newton's law applicable to rotating bodies:

$$N\_dot = (1/J) * Tsum$$

where N_dot is rotational acceleration; J is rotational inertia; and Tsum is summation of external torques acting upon inertia J.

In the exemplary EVT the following matrix equations, determined using Newton's law for each independent free body diagram, correspond to MODE 1 and MODE 2, respectively:

$$[Ni\_dot \ No\_dot]^T = [A1] * [Ti \ Ta \ Tb \ To]^T$$

$$[Ni\_dot \ No\_dot]^T = [A2] * [Ti \ Ta \ Tb \ To]^T$$

where Ni_dot is input member acceleration; No_dot is output member acceleration; Ti is externally applied input member torque; Ta is externally applied motor A torque; Tb is externally applied motor B torque; To is externally applied output member torque; and A1 and A2 are 2×4 matrices of parametric values determined by the hardware gear and shaft interconnections and estimated hardware inertias applicable to MODE 1 and MODE 2, respectively. Other different independent member accelerations may be substituted for those shown above to arrive at similar matrix equations. Ni_dot and No_dot are selected as expedient since both input and output speed are quantities of general interest in other areas of the transmission and vehicle controls.

The matrix equation form is identical for MODE 1 and MODE 2. The parametric constants in A1 and A2, however, may differ. Therefore, further references herein to either MODE 1 or MODE 2 shall be equally applicable to the other.

This basic mode model of the system to be controlled provides the basis for transmission input speed and output torque control. For the exemplary EVT, it is preferred to control the motor torques Ta and Tb and not the input torque Ti at the input member or the output torque To at the output member. Thus, Ti and To are both considered as external input or disturbance torques. Therefore, the basic mode model is rearranged into a matrix equation for solving for motor torques Ta and Tb as follows:

$$[Ta\ Tb]^T = [B1]*[Ti\ To\ Ni\_dot\ No\_dot]^T$$

where B1 is a 2×4 matrix of parametric values determined by the hardware gear and shaft interconnections and estimated hardware inertias applicable to MODE 1 and represents what is commonly referred to as the plant model. The motor torque commands Ta, Tb are calculated based upon the plant dynamic model parameters B1, and specially formulated inputs (Ti, To, Ni_dot, No_dot) to the model. The choices of application for each of these specially formulated inputs are described below.

Figure 3:
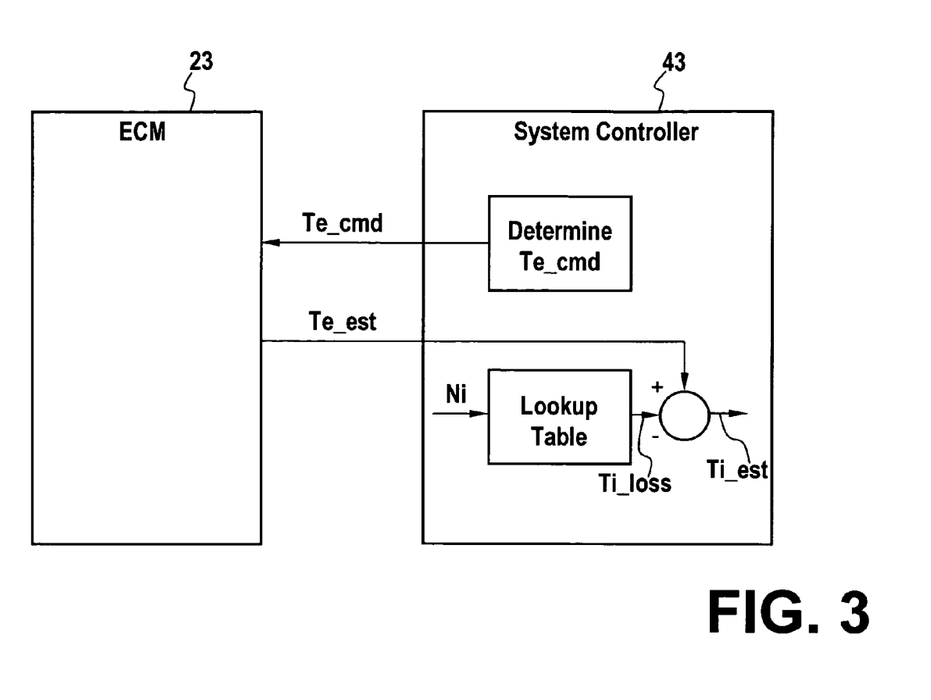
FIG. 3 is a block diagram of EVT input member torque estimation for use in an open loop control of input member speed and output member torque.

The preferred implementation for input member torque Ti is to provide an estimated input torque, Ti_est, for Ti. FIG. 3 provides a block diagram of the method by which estimated input torque Ti_est is determined. An engine torque command, Te_cmd is provided to ECM 23 by the system controller 43. The ECM 23 then provides an estimate of the actual engine torque produced, Te_est, which is provided to the system controller 43. The system controller 43 then calculates an estimate of torque losses to the input member, Ti_loss, through the use of an empirically defined lookup table which is a function of input member speed, Ni. These empirically defined losses represent reductions in torque produced by the engine due to friction, transmission pump losses, engine driven accessories, etc. The engine's estimate of torque produced is then reduced by the loss estimate to calculate the estimated input torque, Ti_est. Through Ti_est, Ta and Tb are calculated in such a manner as to account for and counteract the effects of estimated transmission input torque on transmission input speed.

The preferred implementation for output member torque To is to provide a desired output torque to be produced by the transmission, To_des for To. The external output torque is assumed equal and opposite to the EVT produced output torque and hence To is equated to To_des. The determination of To_des is made based upon several factors such as driver inputs of accelerator pedal position, brake pedal position, shift selector position; vehicle dynamic conditions such as acceleration rate or deceleration rate; and EVT operational conditions such as temperatures, voltages, currents and speeds. Through To, Ta and Tb are calculated in such a manner as to produce the desired transmission output torque.

Figure 4:
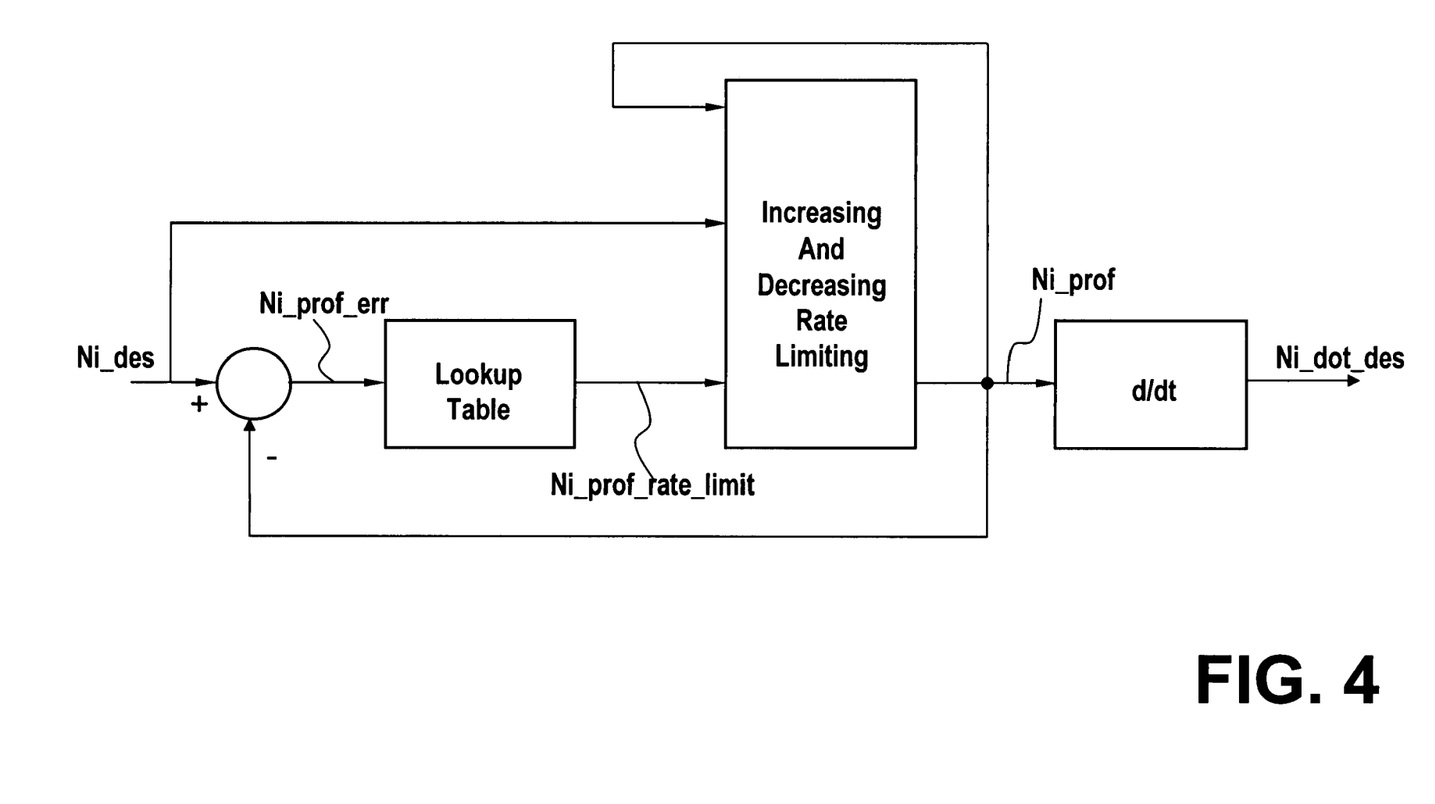
FIG. 4 is a block diagram of EVT input member speed profile determination and desired input member acceleration determination.

The preferred implementation for input member acceleration Ni_dot is to provide a desired rate of change of transmission input speed, Ni_dot_des, for Ni_dot. Given a desired transmission input speed, Ni_des, a transmission input speed trajectory is determined, called an input speed profile, Ni_prof. Desired input speed is provided by the system controller 43, for example in accordance with a desired operating point of the engine 14 to meet various efficiency and emission objectives. A preferred method of determining input speed is disclosed in commonly assigned and co-pending U.S. Ser. Nos. 10/686,508 and 10/686,034 which are incorporated herein by reference. The method by which Ni_prof is determined is shown in FIG. 4. The present value of the trajectory, Ni_prof is subtracted from the desired speed Ni_des to obtain an input speed profile error Ni_prof_err. This error is then used in a lookup table to determine the allowable rate of change for the input speed profile Ni_prof rate_limit. The values used within the lookup table are empirically determined based upon objective and subjective criteria such as system responsiveness capability, noise and vibration due to changes in engine operating speed, vehicle stability, and effects on engine operating characteristics such as fuel economy and emissions that may be related to the change rate of engine operation. In general, it is desirable to allow a higher rate of change, Ni_prof rate_limit, for a larger error, Ni_prof_err. Then the present value of the profile, Ni_prof, the desired final value of the profile, Ni_des, and the allowable rate of change, Ni_prof_rate_limit, are inputs to a rate limiter. This rate limiter allows the value of the profile, Ni_prof, to be modified in the direction of the final value, Ni_des, at a rate that is no faster than the rate limit, Ni_prof_rate_limit, until the profile, Ni_prof, becomes equal to the desired value, Ni_des. The derivative with respect to time of Ni_prof is then taken to determine the desired rate of change of transmission input speed, Ni_dot_des. Through Ni_dot, Ta and Tb are calculated in such a manner as to cause transmission input speed to change at a desired rate, Ni_dot_des.

The preferred implementation for output member acceleration No_dot is to provide a calculated output member acceleration, No_dot_calc, for No_dot. No_dot_calc is calculated as follows:

$$No\_dot\_calc = Filter[d(No)/dt]$$

by taking the derivative of measured EVT output member speed No with respect to time and then applying a filter to this derivative to eliminate large disturbances from the calculation. Through No_dot, Ta and Tb are calculated in such a manner as to compensate the transmission output torque produced for measured transmission output accelerations and hence vehicle accelerations. This term compensates for wind resistance, application of vehicle friction brakes, road gradation, and other vehicle load torque conditions which cannot be adequately predicted.

With the substitution of these parameters into the basic mode model, the implementation model is realized and takes the form of the matrix equation represented below for MODE 1:

$$[Ta\quad Tb]^T = [B1]*[Ti\_est\quad To\_des\quad Ni\_dot\_des\quad No\_dot\_calc]^T$$

Figure 5:
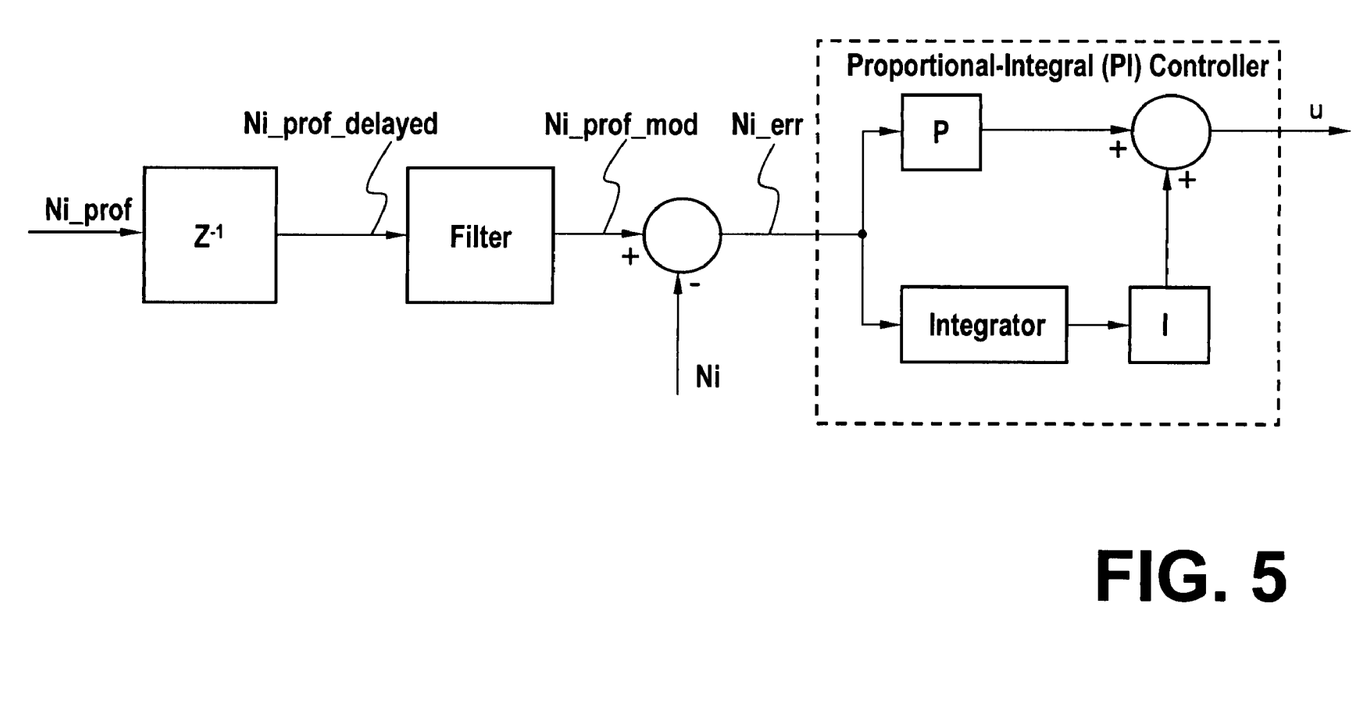
FIG. 5 is a block diagram of closed loop input member speed error determination and closed loop control effort determination.
Figure 6:
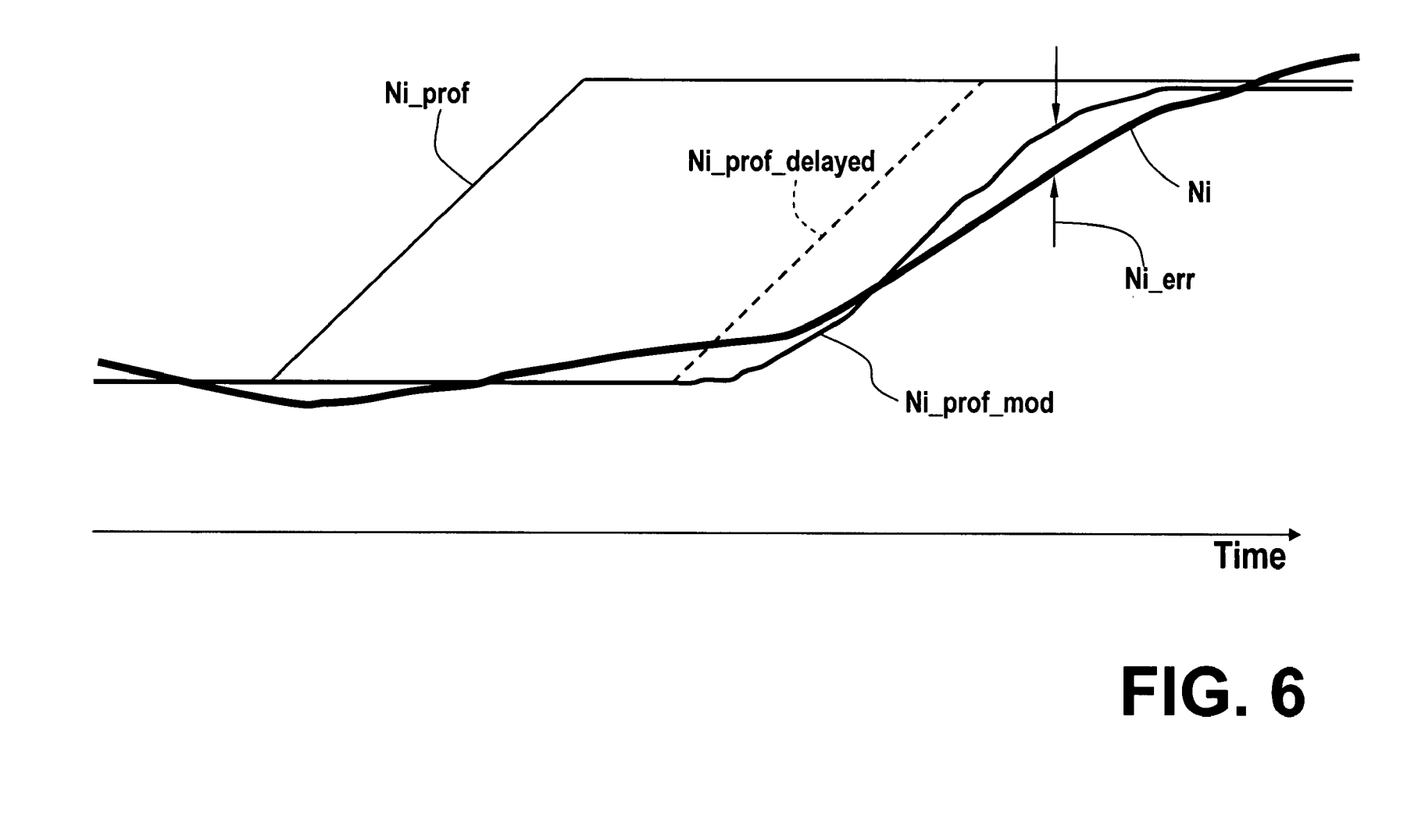
FIG. 6 is a graphical representation of the closed loop input member speed error determination and closed loop control effort determination illustrated in FIG. 5.

To compensate for system and plant model errors, a closed loop control portion is added to the open loop control, as follows:

$$[Ta\quad Tb]^T = [B1]*[Ti\_est\quad To\_des\quad Ni\_dot\_des\quad No\_dot\_calc]^T + [k1k2]^T*u$$

where k1 and k2 formulate a vector gain matrix for closed loop correction of Ta and Tb, and u is the closed loop control effort. With reference to FIG. 5, the closed loop control effort u is determined by applying a Proportional-Integral (PI) controller to a calculated error Ni_err in EVT input member speed, where Ni_prof is the reference as described. However, in the exemplary system described, it is foreseeable that significant inflection points and rapid changes may be commanded in the control system reference. As such, during the transient response the actual system may lag substantially behind the reference causing an error for an extended period of time. Such extended error would cause the closed loop to overcompensate such that when the reference reaches its new steady state value, the control system would cause an undesirable overshoot in the response of the torque commands to the motors. To address this situation, a modified input speed profile Ni_prof_mod is developed as the reference for the comparison of the feedback parameter Ni, as described below and with continued reference to FIG. 5 and additional reference to FIG. 6. A time delayed version Ni_prof_delayed of the transmission input speed profile Ni_prof is created. The time delayed signal is then passed through a filter to produce the modified input speed profile, Ni_prof_mod. The input speed error Ni_err upon which the closed loop action is to occur is then determined according to the difference (Ni_prof_mod-Ni). The intent of the time delay and filter is to produce a profile that would be similar in nature to the open loop response of the system to Ni_prof and minimize the closed loop action required during the transient condition. Therefore, the parametric values (i.e., calibrations) selected for the time delay, the selection of the filter type, and the filter parametric values will be chosen in a fashion such that Ni_prof mod will most nearly match the open loop response of the system to changes in Ni_prof.

Figure 7:
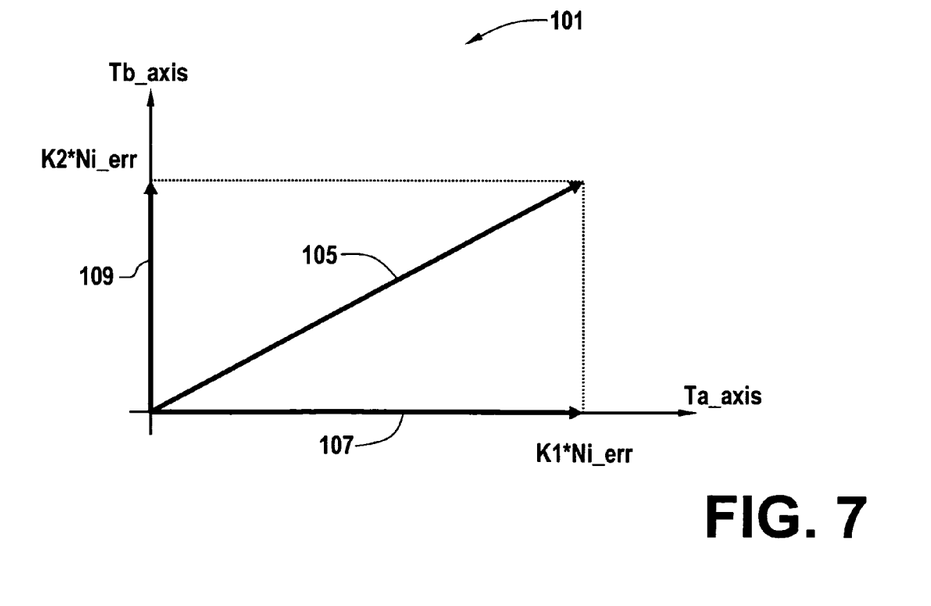
FIG. 7 is a graphical representation of closed loop gain determinations.

With reference now to FIG. 7, the gains k1 and k2 form the basis for a vector in the plane of Ta and Tb space 101. This allows for independent placement of the closed loop gain action, which may be empirically determined, resulting for example in the tuned Ni_dot vector 105, resolved Ta vector 107 and resolved Tb vector 109. Since one of the most common system errors is the input torque estimate Ti_est, the closed loop error may be attributed to the input by calibrating the gain matrix [k1 k2]$^T$ in the direction of input torque. However, it should be recognized that errors due to other factors such as un-modeled frictions, inertia value inaccuracies or sub-system abnormalities may create a potential for impaired output torque control. This potential is particularly important at low transmission output speeds where an output torque error may produce slight forward drive of the output member 64 when reverse is commanded, or vice versa.

Figure 8:
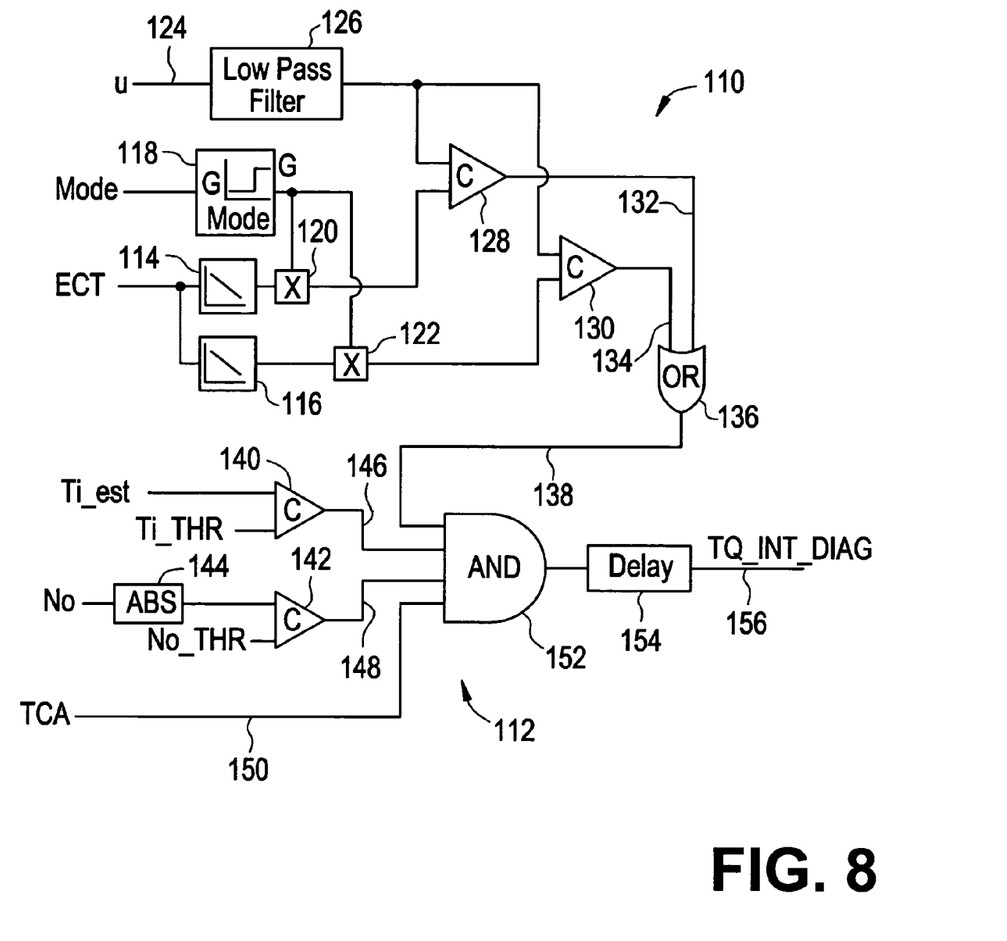
FIG. 8 is a block diagram of the diagnostic control of the present invention.

The block diagram of FIG. 8 illustrates a method of diagnosing the output torque integrity of the above-described speed and torque control. The reference numeral 110 generally designates a portion of the diagram for determining if the closed loop control effort u is larger than expected, and the reference numeral 112 generally designates a portion of the diagram for determining if action should be taken to limit the authority of the control.

The primary source of expected system error, input torque estimation error, is highest during cold start operation of the engine 14, and then decreases as the engine warms up. Thus, the expected closed loop effort can be reliably mapped as a function of engine operating temperature, and the look-up tables 114 and 116 are calibrated to provide the greatest expected closed loop effort for positive and negative error, respectively, as a function of the engine coolant temperature ECT. The block 118 provides a mode-based scaling factor G, which is applied to the look-up table outputs by the multiplier blocks 120 and 122. The actual closed loop effort u on line 124 is low pass filtered by filter block 126, and then compared to the mode-specific expected closed loop efforts by the comparators (C) 128 and 130. If the filtered closed loop effort is positive and greater than the expected closed loop effort for positive input torque error, the comparator 128 produces an output on line 132. If the filtered closed loop effort is negative and less than the expected closed loop effort for negative input torque error, the comparator 130 produces an output on line 134. In the presence of an output on lines 132 or 134, the OR-Gate 136 produces an output on line 138, indicating that the magnitude of the closed loop control effort u is larger than expected.

The block diagram portion 112 includes a first comparator 140 for comparing the estimated input torque Ti_est with an input torque threshold Ti_THR, and a second comparator 142 for comparing the magnitude of the output member speed No to an output speed threshold No_THR, with the block 144 performing an absolute value (ABS) function on the output member speed No. The input torque threshold Ti_THR is calibrated to a near-zero torque value to distinguish between positive torque contribution by the engine 14 and engine braking. The presence of engine speed braking effectively rules out unintended directional control, and the comparator 140 produces an output on line 146 when Ti_est is greater than Ti_THR, signifying that engine braking is not present. The output speed threshold No_THR is calibrated to a low speed magnitude such as 5 MPH, and the comparator 142 produces an output on line 148 when No is less then No_THR. Finally, the line 150 has a state that is high or active whenever the above-described input speed/output torque control is active, as indicated by a TCA(torque control active) flag. The lines 138, 146, 148 and 150 are applied as inputs to AND-Gate 152; if outputs are present on each of the lines 138, 146, 148 and 150 for at least a predetermined delay period defined by block 154, the torque integrity diagnostic (TQ_INT_DIAG) on line 156 becomes active, indicating that there exists a potential for impaired output torque control that could result in a directional drive error. In such event, the system controller 43 acts to limit the authority of the aforementioned input speed/output torque control.

In summary, the diagnostic control of the present invention reliably detects the existence of a torque control error at low speed operation of the transmission near the boundary between forward and reverse operation. While the invention has been described by reference to certain preferred embodiments, it should be understood that numerous changes could be made within the spirit and scope of the inventive concepts described. For example, the method applies to powertrain configurations different that the exemplary configuration, the threshold values set forth herein are exemplary only, and so on. Accordingly, it is intended that the invention not be limited to the disclosed embodiments, but that it have the full scope permitted by the language of the following claims.

What is claimed is:

1. A torque integrity diagnostic method for a parallel electrically variable transmission including an input member coupled to an engine, at least one electric machine, an output member, the method comprising the steps of:
   establishing an open loop control of said electric machine as a predetermined function of preselected transmission torques and accelerations so that a speed of the input member conforms to a desired input speed and a torque transmitted by the output member conforms to a desired output torque;

establishing a closed loop effort based on a deviation of the input member speed from said desired input speed for adjusting said open loop control to compensate for control errors;

detecting a condition for which a magnitude of the closed loop effort is greater than expected; and activating a torque integrity diagnostic indication when said condition is detected and the forward or reverse speed of said output member is below a speed threshold for which directional error of said output member is possible.

2. The method of claim 1, including the steps of:

determining an expected closed loop effort;

low pass filtering the established closed loop effort to form a filtered closed loop effort; and detecting said condition when the a magnitude of the filtered closed loop effort is greater than said expected closed loop effort.

3. The method of claim 2, where said transmission is selectively operable in at least two modes, and said expected closed loop effort is determined as a predetermined function of the selected mode.

4. The method of claim 2 wherein said expected closed loop effort is determined as a predetermined function of an operating temperature of said engine.

5. The method of claim 1, including the steps of:
detecting a condition of engine braking; and
preventing activation of said torque integrity diagnostic indication when said engine braking condition is detected.

6. The method of claim 5, including the steps of:
estimating an input torque supplied to said input member by said engine; and
detecting said condition of engine braking when said estimated input torque is less then a predetermined torque threshold.

7. The method of claim 1, including the step of:
preventing activation of said torque integrity diagnostic indication until said condition is detected and the forward or reverse speed of said output member is below a speed threshold for at least a predetermined time.

8. The method of claim 1, wherein said open loop control is based in part on an estimation of input torque supplied to said input member by said engine, and said expected closed loop effort is determined as a function of expected error in said estimation.

9. The method of claim 8, wherein said expected error in said estimation varies with a temperature of said engine, and said expected closed loop effort is determined as a predetermined function of an operating temperature of said engine.

* * * * *